United States Patent [19]
Hirai et al.

[11] Patent Number: 6,014,273
[45] Date of Patent: Jan. 11, 2000

[54] PHOTOMETERING APPARATUS

[75] Inventors: Isamu Hirai; Katsuki Machida, both of Tokyo, Japan

[73] Assignee: Asahi Kogaku Kogyo Kabushiki Kaisha, Tokyo, Japan

[21] Appl. No.: 09/098,462

[22] Filed: Jun. 17, 1998

[30] Foreign Application Priority Data

| Jun. 18, 1997 | [JP] | Japan | ................................ 9-161265 |
| Jun. 18, 1997 | [JP] | Japan | ................................ 9-161266 |
| Sep. 11, 1997 | [JP] | Japan | ................................ 9-246308 |

[51] Int. Cl.[7] .............................. G02B 7/02; G03B 19/12
[52] U.S. Cl. ........................................ 359/819; 396/354
[58] Field of Search ...................... 359/819, 811; 396/354, 359

[56] References Cited

U.S. PATENT DOCUMENTS

| 4,445,764 | 5/1984 | Matsumura | 354/480 |
| 4,777,506 | 10/1988 | Hiramatsu et al. | 354/480 |
| 5,585,885 | 12/1996 | Muramatsu | 396/111 |
| 5,604,554 | 2/1997 | Kirigaya | 396/296 |
| 5,835,797 | 11/1998 | Okada | 396/51 |

*Primary Examiner*—Georgia Epps
*Assistant Examiner*—Ricky Mack
*Attorney, Agent, or Firm*—Greenblum & Bernstein, P.L.C.

[57] ABSTRACT

A photometering apparatus having a photometering lens and a light receiver to measure a finder screen of a single lens reflex camera, wherein the photometering lens and the light receiver are arranged so that the focusing screen is substantially conjugate with a light receiving surface of the light receiver, and a transparent optical element is inserted between the photometering lens and the light receiver.

22 Claims, 14 Drawing Sheets

Fig. 5A
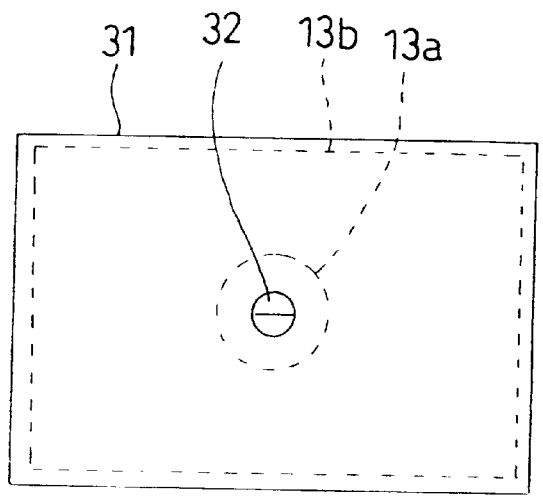
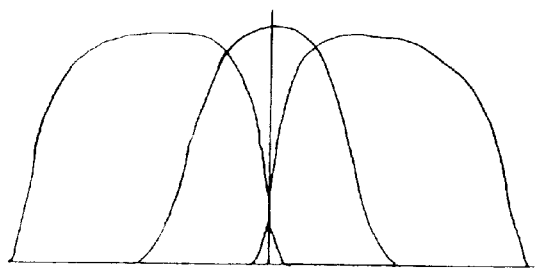
Fig. 5B
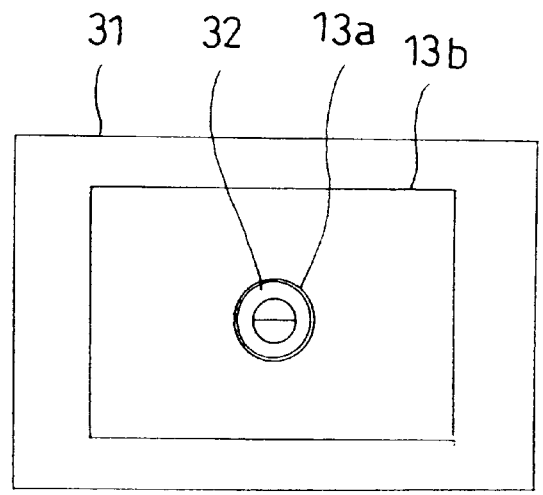
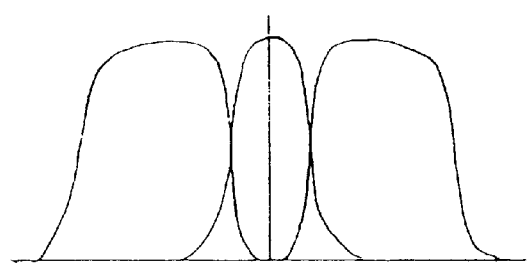

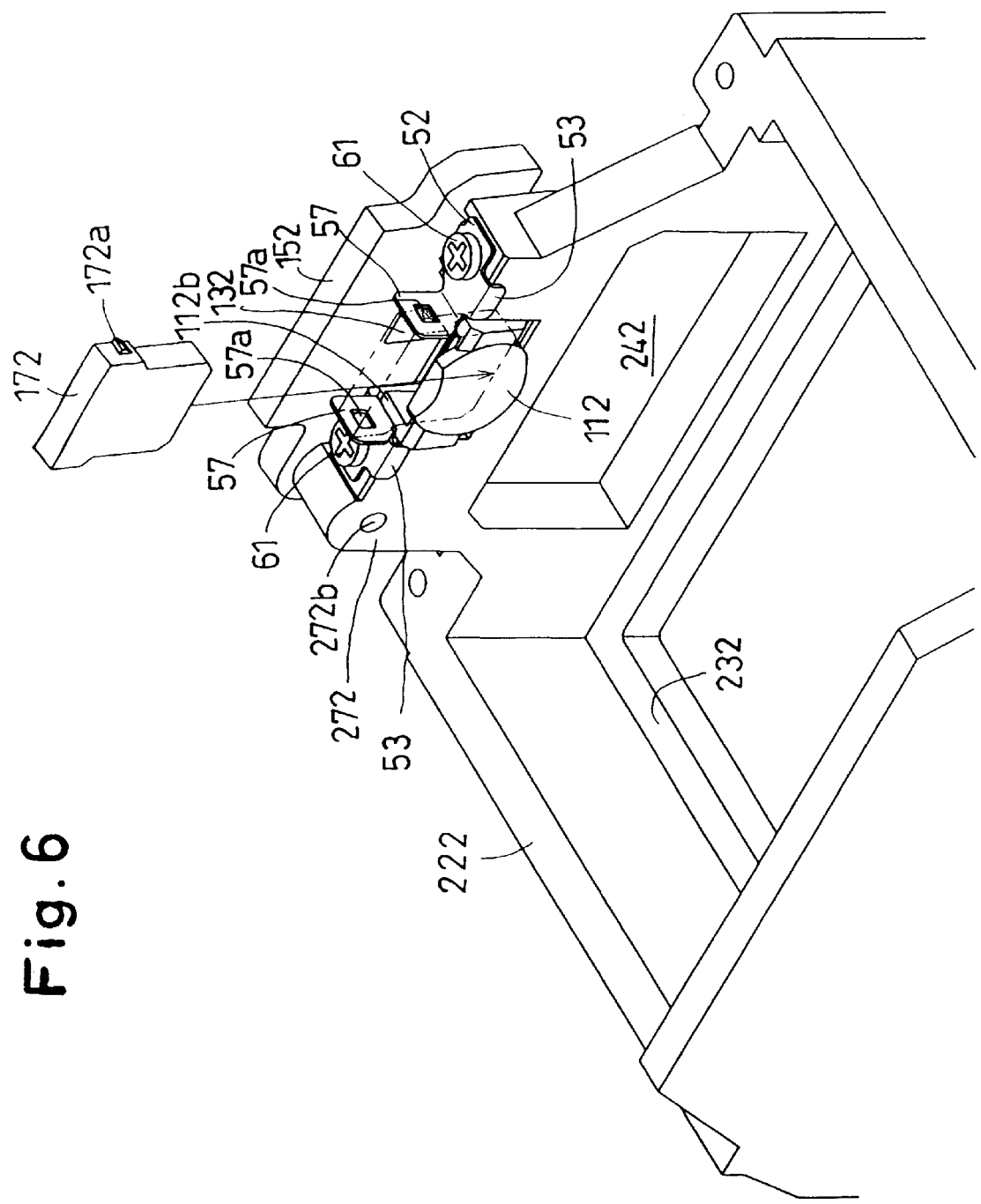

PHOTOMETERING APPARATUS

BACKGROUND OF THE INVENTION

1. Field of the Invention

The present invention relates to a photometering apparatus particularly for a single lens reflex camera.

2. Description of the Related Art

There is known a photometering apparatus used in a single lens reflex camera in which object image carrying light transmitted through a finder screen (focusing screen) is received by a light receiver to carry out a photometering operation.

However, in case of a photometering apparatus using split photometering elements including a center photometering area, if a finder screen which is provided on the center portion thereof with a focusing split prism or microprism, etc., is used, the object light transmitted through the microprism, etc., is diffused on the light receiving element, and hence, it is difficult to adjust the center position (centering) of the light receiver.

SUMMARY OF THE INVENTION

It is an object of the present invention to provide a photometering apparatus in which the photosensitivity distribution smoothly changes and the position of a light receiver can be precisely and easily adjusted within a short space of time.

To achieve the object mentioned above, according to an aspect of the present invention, there is provided a photometering apparatus having a photometering lens and a light receiver to measure a finder screen of a single lens reflex camera, wherein the photometering lens and the light receiver are arranged so that the focusing screen is substantially conjugate with the light receiving surface of the light receiver, and a transparent optical element is inserted between the photometering lens and the light receiver.

The transparent optical element can be made of a plane-parallel plate or a lens having positive or negative power.

In an embodiment, the transparent optical element can be removed when the adjustment of the center of the light receiver is carried out and can be attached after the adjustment is completed.

Preferably, the photometering lens and the light receiver are attached to a pentagonal prism holder of a single lens reflex camera which is provided with a guide groove in which the optical element can be detachably fitted between the photometering lens and the light receiver in a plane perpendicular to the optical axis of the photometering lens.

The photometering lens can be attached to a pentagonal prism holder of a single lens reflex camera which is provided with a light receiver holding retainer which elastically holds the light receiver. The light receiver holding retainer can be provided with a pair of holding pieces which are adapted to elastically hold the optical element between the photometering lens and the light receiver.

The transparent optical element can be made of a plane-parallel plate which is provided on opposite sides thereof with engaging projections. The light receiver holding retainer can be provided on the holding pieces thereof with engaging holes in which the engaging projections can be engaged.

The pentagonal prism holding retainer can be provided with a bridge portion which bridges a light path of an eyepiece. The bridge portion can be provided with a pair of mounting walls on opposite sides of the light path of the photometering lens and the light receiver. The mounting walls can be equipped on opposite end surfaces thereof with guide grooves in which the photometering lens can be fitted. The light receiver holding retainer can be provided with a pair of shoulder portions which can hold therebetween the mounting walls from above and holding pieces which are provided on the shoulder portions to hold the transparent optical element between the holding pieces.

The light receiver holding retainer can be provided with a clip piece which is adapted to elastically hold a substrate to which the light receiver is attached.

The light receiver can be made up of split photometering elements. Alternatively, the light receiver can be made up of split photometering elements which can independently measure a circular central photometering area and a peripheral photometering area surrounding the central photometering area.

The finder screen can be provided on the center portion thereof with a focusing split prism or microprism.

According to another aspect of the present invention, there is provided a photometering apparatus having a photometering lens and a light receiver to measure a finder screen of a single lens reflex camera, wherein the photometering lens and the light receiver are arranged so that a transparent optical element can be inserted therebetween and that the focusing screen is substantially conjugate with a light receiving surface of the light receiver when the transparent optical element is inserted.

Likewise with the first aspect of the present invention, the transparent optical element can be made of a plane-parallel plate or a lens having positive or negative power. The transparent optical element can be inserted when the centering of the light receiver is carried out and can be removed when the centering operation is completed.

Preferably, the photometering lens and the light receiver are attached to a pentagonal prism holder of a single lens reflex camera which is provided with a guide groove in which the optical element can be detachably fitted between the photometering lens and the light receiver in a plane perpendicular to the optical axis of the photometering lens.

The present disclosure relates to subject matter contained in Japanese Patent Applications Nos. 9-161265 (filed on Jun. 18, 1997), 9-161266 (filed on Jun. 18, 1997) and 9-246308 (filed on Sep. 11, 1997) which are expressly incorporated herein by reference in their entireties.

BRIEF DESCRIPTION OF THE DRAWINGS

The invention will be discussed below with reference to the accompanying drawings, in which;

FIGS. 5A and 5B are schematic views of a relationship between a finder screen and a photometering area in a single lens reflex camera and graphs showing a photosensitivity distribution in a defocus state (out of focus state) in which a parallel-plane plate is attached and in an in-focus state in which a plane-parallel plate is removed, respectively;

FIG. 6 is a perspective view of a photometering apparatus and a pentagonal prism holding frame and the surroundings thereof according to another embodiment of the present invention;

DESCRIPTION OF THE PREFERRED EMBODIMENT

Figure 1:
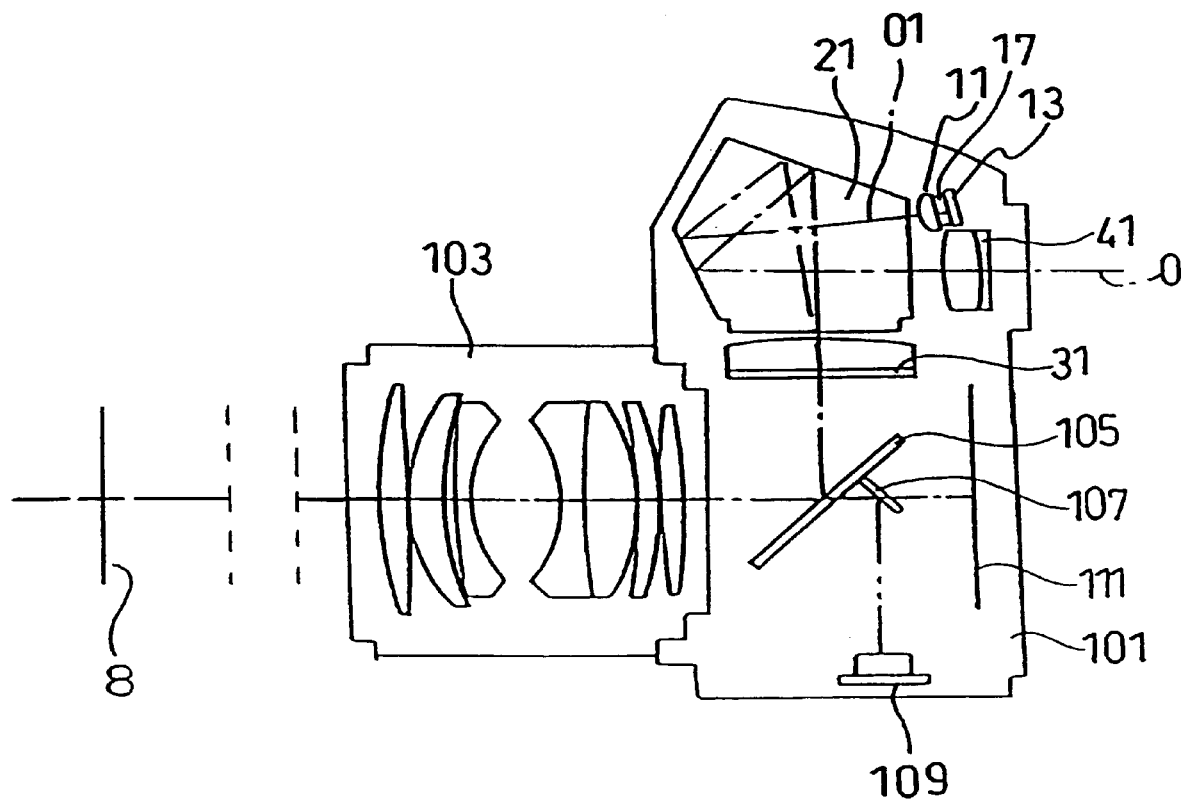
FIG. 1 is a schematic view of a single lens reflex camera to which the present invention is applied.

In FIG. 1, which shows a sectional view of a single lens reflex camera to which the present invention is applied, the single lens reflex camera is comprised of a camera body 101 to which a photographing lens 103 is detachably attached. Object image carrying light is partly transmitted through a main mirror 105; is reflected by a sub-mirror 107; and is made incident upon an AF sensor unit 109. The light incident upon the main mirror 105 is partly reflected thereby; is converged onto a finder screen (focusing screen) 31 to form (or project) an object image; and passes through the finder screen. The finder screen is located in a position optically conjugate with a film surface 111. The object light transmitted through the finder screen is reflected by a pentagonal prism 21; is partly transmitted through an eyepiece 41; is partly transmitted through a photometering lens (light receiving element) 11 and a plane-parallel plate 17 made of a transparent material; and is made incident upon a light receiver 13.

Figure 2:
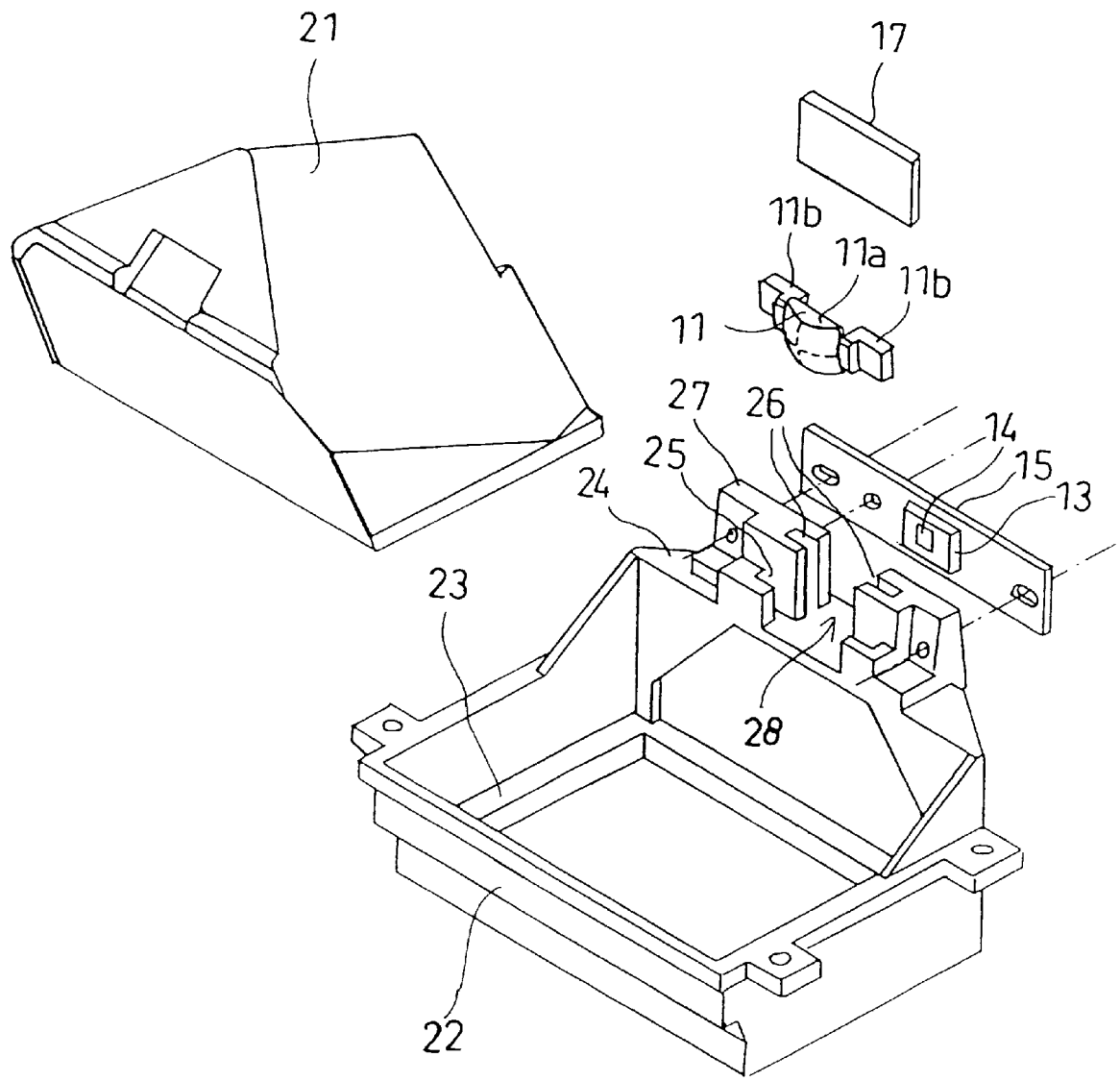
FIG. 2 is an exploded perspective view of a photometering apparatus and a pentagonal prism holding frame and the surroundings thereof in a single lens reflex camera according to the present invention.

FIG. 2 shows a photometering apparatus and a pentagonal prism and the surroundings thereof in a single lens reflex camera, according to the present invention. The photometering apparatus is provided with the photometering lens 11 and the light receiver (SPD) 13. The photometering lens 11 is made of plastics and is provided with a lens portion 11a and a pair of mounting flanges 11b on opposite sides of the lens portion 11a. The light receiver 13 is secured to a substrate 15.

The photometering lens 11 and the light receiver 13 are mounted to a pentagonal prism holding frame (prism holder) 22 which is adapted to mount the hollow pentagonal mirror 21 as a pentagonal prism to the camera body. The prism holder 22 is provided with a body portion 23 on which the hollow pentagonal mirror 21 is placed and a photometer mounting bridge portion 24 which bridges an emission opening of the hollow pentagonal mirror 21 placed on the body portion 23. The bridge portion 24 is provided with a pair of substrate mounting walls 27 to which the substrate 15 of the light receiver 13 is mounted. A photometering light path 28 is defined between the substrate mounting walls 27. The substrate mounting walls 27 are provided on opposite ends thereof with guide grooves 25 in which the photometering lens 11 is fitted and a pair of guide grooves 26 in which the transparent plane-parallel plate 17 is detachably held, so that the plane-parallel plate 17 lies in a plane perpendicular to the optical axis O1. Note that the finder screen 31 is secured to the lower surface of the body portion 23 of the prism holder 22.

Figure 3:
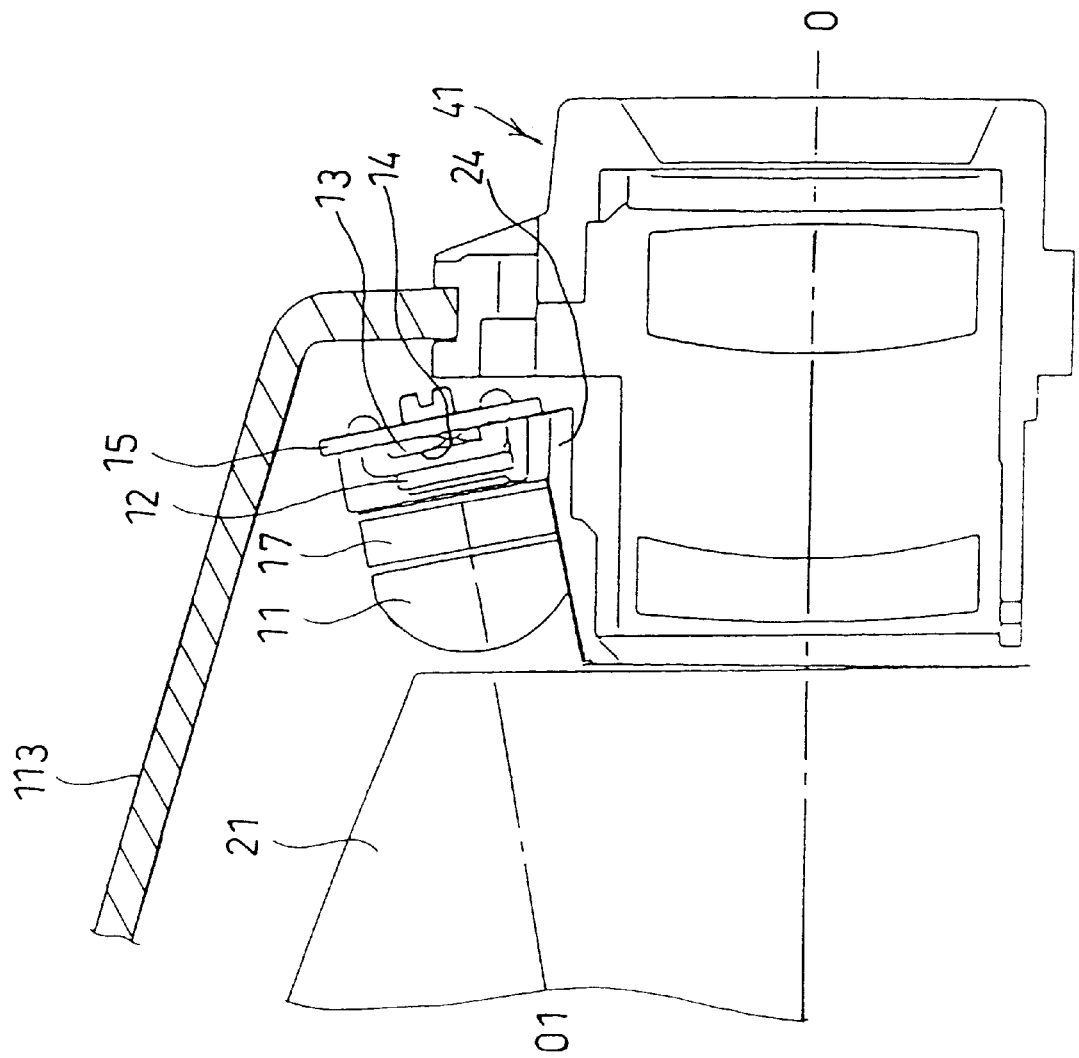
FIG. 3 is a sectional view of an assembly of a photometering apparatus and a pentagonal prism holding frame and the surroundings thereof in a single lens reflex camera according to the present invention.

To secure the photographing lens 11, the mounting flanges 11b are inserted in the lens guide grooves 25 and are secured thereto by means of an adhesive or the like. The substrate 15 is secured to the substrate mounting walls 27 by means of screws (not shown) so as to adjust the position thereof. The plane-parallel plate 17 is secured by an adhesive or the like. The assembly is shown in FIG. 3.

The adjustment (centering) of the center of the light receiver 13 will be discussed below with reference to FIGS. 4 and 5. FIGS. 5A and 5B show a relationship between the finder screen 31 and the photometering areas. In a single lens reflex camera in the illustrated embodiment, the object image formed on the finder screen 31 is re-formed at a position rear of the light receiving surface 14 of the light receiver 13 by the photometering lens 11. Namely, an image out of focus (defocus image) is reformed. The light receiver 13 is made of split photometering elements which can independently measure a circular central photometering area 13a and a peripheral photometering area 13b surrounding the central photometering area 13a.

FIG. 5A shows the photometering areas 13a and 13b in the defocus state in which the plane-parallel plate 17 is mounted, and the photosensitivity distribution in the photometering areas 13a and 13b. FIG. 5B shows the photometering areas 13a and 13b in the focus state in which the plane-parallel plate 17 is removed, and the photosensitivity distribution in the photometering areas 13a and 13b. In the graphs shown in FIGS. 5A and 5B, the ordinate represents the intensity and the abscissa represents the coordinates in the horizontal direction.

As can be seen in FIG. 5A, the image of the finder screen 31 is formed in rear of the light receiving surface 14 of the light receiver 13 when the plane-parallel plate 17 is inserted between the photometering lens 11 and the light receiver 13, and hence the image formed on the light receiving surface 14 is unclear. Consequently, the photosensitivity distribution curve smoothly changes.

If the image is unclear, the change in the output of the photometering areas at the boundary thereof is small, so that it is difficult to detect the position of the boundary. Consequently, it is difficult to adjust the central photometering area 13a to be identical to the center of the finder screen 31 or to adjust the center of the light receiver 13 to be identical to the center of the finder screen 31. Moreover, if the focusing microprism 32 is provided at the center of the finder screen 31, the image in the central photometering area is diffused. Consequently, it is more difficult to detect the boundary of the photometering areas.

Figure 4:
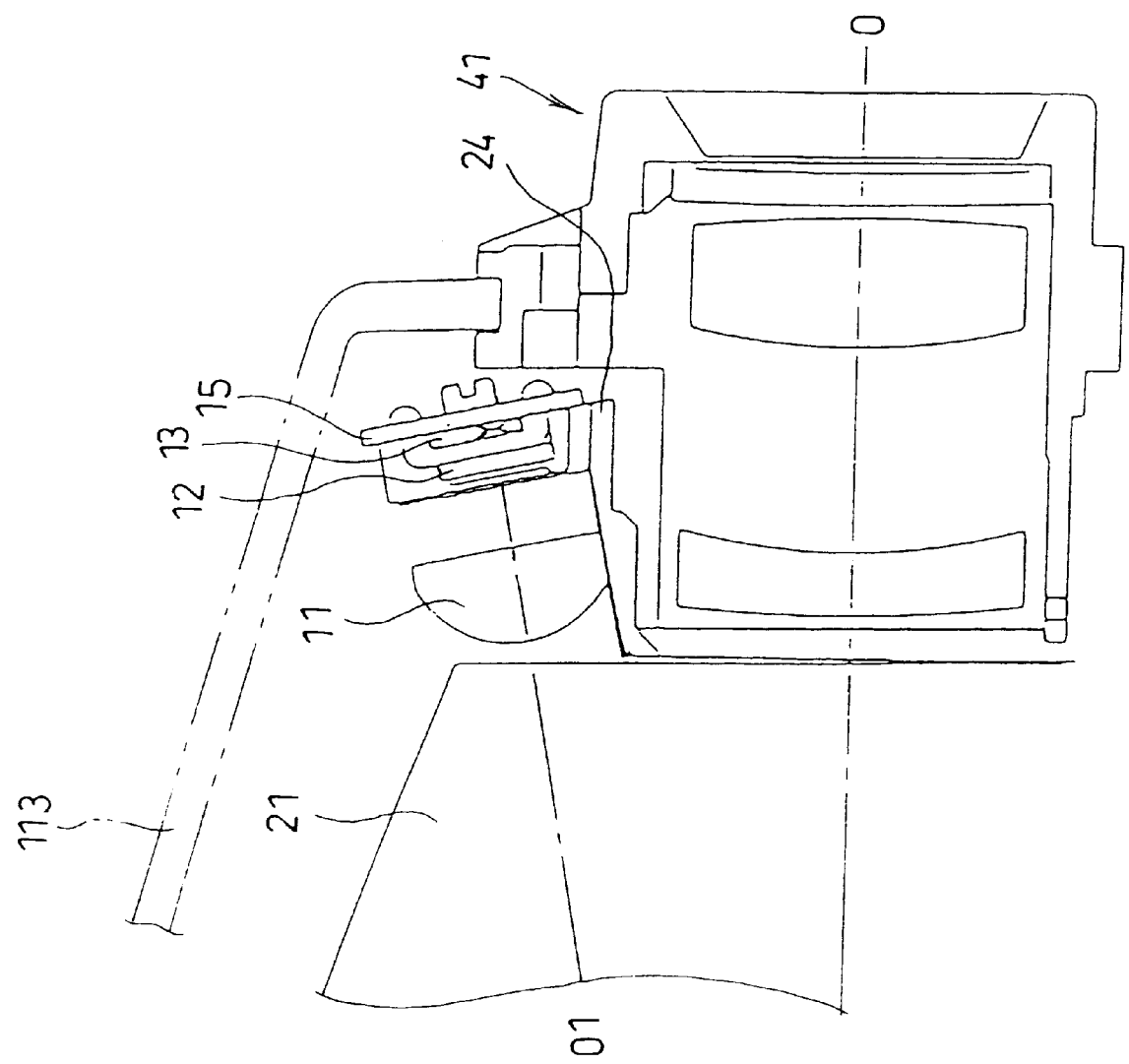
FIG. 4 is a sectional view of a photometering apparatus and pentagonal prism holding frame and the surroundings thereof in a single lens reflex camera, when a removed plane-parallel plate is removed when the centering operation is carried out, according to the present invention.

To prevent this, in the illustrated embodiment, when the centering (adjustment) is carried out, the plane-parallel plate 17 is removed (FIG. 4). When the plane-parallel plate 17 is detached, the optical path length between the photometering lens 11 and the light receiver 13 is reduced, so that the finder screen 31 is conjugate with the light receiving surface 14 of the light receiver 13. Thus, a clear image of the finder screen 31 (object image formed on the finder screen 31) can be re-formed on the light receiving surface 14 of the light receiver 13 (FIG. 5B). If the image is in focus, the output boundary of the photometering areas is distinguishable, and hence the adjustment to make the center of the light receiver 13 coincident with the center of the finder screen 31 can be facilitated. Note that the light path length when the plane-parallel plate 17 is removed is reduced by $t \times (n-1)$ wherein "t" designates the thickness of the plane-parallel plate and "n" ($>1$) represents the refractive index thereof.

The adjustment (centering operation) will be explained below by way of example. The single lens camera to be adjusted has the upper cover 113 removed and the plane-parallel plate 17 is not attached (FIG. 4). A reference chart plate 8 (FIG. 1) which lies in a plane perpendicular to the optical axis O1 of the photographing lens 103 is located at a predetermined object distance to perform the focusing operation. The outputs of the photometering areas 13a and 13b of the light receiver 13 are sent to a measuring device and the intensities thereof are indicated, for example, in a display.

For example, the chart plate 8 can constitute a white circular disc on a black background. Upon adjustment, the center of the chart plate 8 is located at the center of the finder screen 31. The outputs of the photometering areas 13a and 13b of the light receiver 13 are supplied to the measuring device and the intensities of the outputs are displayed in a display. The substrate 15 is moved up and down and/or right and left along the substrate mounting walls 27 so that the image of the chart plate 8 is formed at the center of the light receiver 13. Alternatively, it is possible to move the substrate 15 up and down and/or right and left along the substrate mounting walls 27 while monitoring the output of the light receiver 13 to detect the output of the central photometering area 13a of the light receiver 13. The position at which the peak output is obtained corresponds to the center position.

Upon completion of the centering operation (adjustment) of the light receiver 13, the substrate 15 is secured by adhesive or screws, and the plane-parallel plate 17 is attached. Consequently, a photometering apparatus in which the center of the photometering area of the light receiver 13 is identical to the center of the finder screen 31 and A smooth variation in photosensitivity distribution can be obtained as shown in FIG. 5A.

FIGS. 6 through 9 show another embodiment of the present invention in which the plane-parallel plate can be detachably attached. In this embodiment, the plane-parallel plate 172 and the substrate 152 are held by a light receiver retainer 51. The basic structure of the photometering lens 112, the light receiver 132, and the substrate 152 is the same as that of the first embodiment. The pentagonal prism holder (prism holder) 222 is provided with the body portion 232 on which the hollow pentagonal mirror 21 can be located and the bridge portion 242 which bridges the emission opening (light path of the eyepiece) of the pentagonal mirror 21 located on the body portion 232, similar to the pentagonal prism holder 22.

The bridge portion 242 of the pentagonal prism holder 222 is provided with a pair of mounting walls 272 to which the photometering lens, the plane-parallel plate and the light receiver 132 are mounted. A photometering light path 282 is defined between the mounting walls 272. The mounting walls 272 are provided on opposite ends thereof with guide grooves 262 in which the photometering lens 112 is fitted. The guide grooves 262 have a width which decreases toward the bottoms thereof. The flanges 112b for mounting the photometering lens 112 are tapered corresponding to the lens guide grooves 262.

The mounting walls 272 are provided on the upper surfaces thereof with threaded holes 272a in which screws are screwed to secure the light receiver retainer 51. One of the mounting walls 272 is also provided with a threaded hole 272b extending therethrough in the optical axis direction, in which a screw is screwed to secure the substrate 152.

Figure 9:
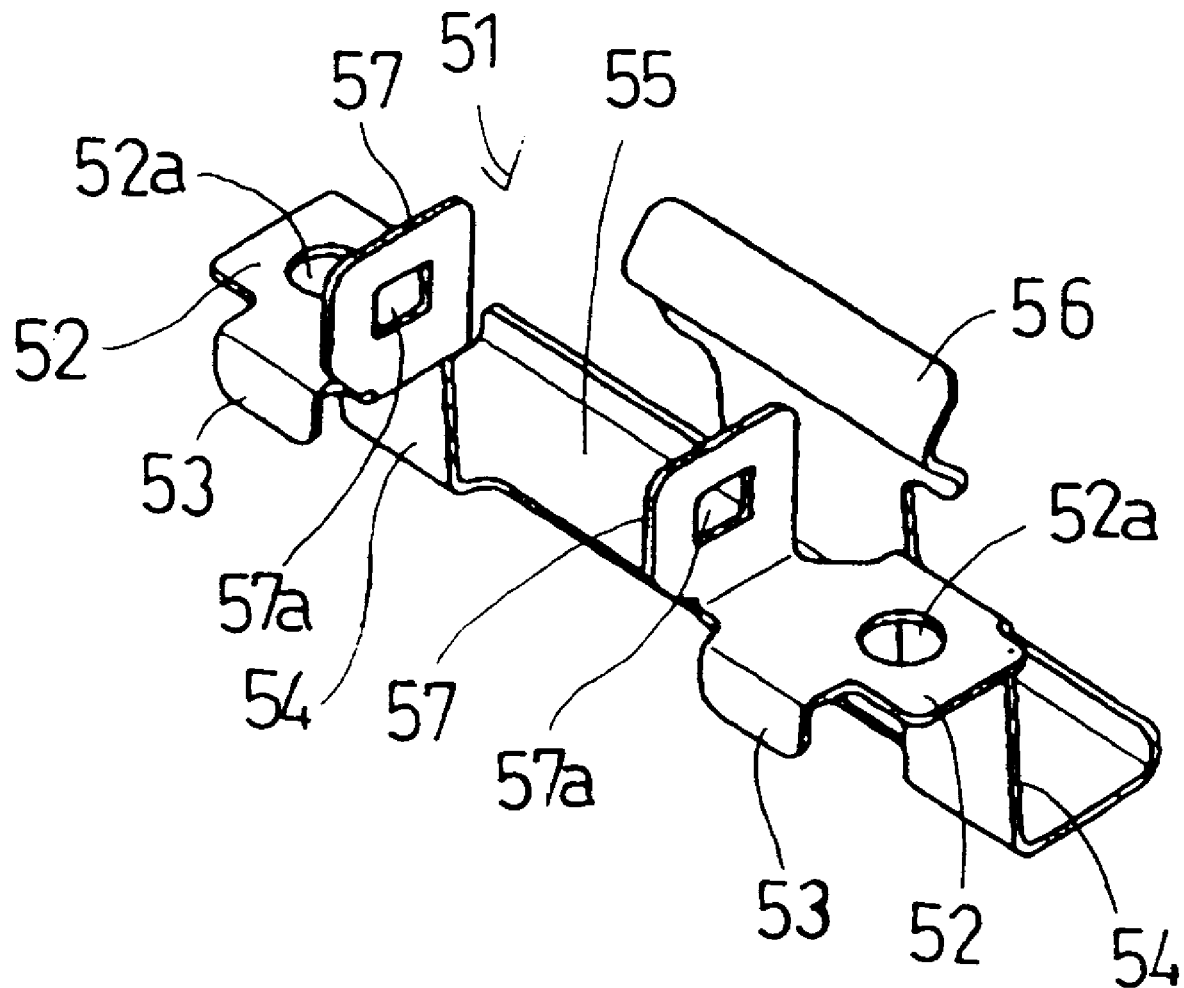
FIG. 9 is a perspective view of a light receiver retainer.

The light receiver retainer 51 is shown in detail in FIG. 9. The retainer 51 is provided with shoulder portions 52 which hold therebetween the mounting walls 272. The shoulder portions 52 are each provided with a pair of bent flanges 53 and 54 which hold therebetween the mounting walls 272 in the optical axis direction, and a hole 52a corresponding to the threaded hole 272a. The rear flanges 54 extend downward by a length longer than the front flanges 53 and are bent rearward to be connected to the connecting portion 55. The connecting portion 55 is provided, on the rear end of the intermediate portion thereof, with a clip piece 56 formed by bending the connecting portion 55 upward. The shoulder portions 52 are provided, on the opposite ends thereof, with holding pieces 57 which are formed by bending the shoulder portions 52 upward and which define therebetween the photometering light path 282. The holding pieces 57 are provided with engaging holes 57a in which the engaging projections 172a formed on the side surfaces of the plane-parallel plate 172 can be engaged. The light receiver retainer 51 can be formed by pressing an elastically deformable metal piece or can be made of synthetic resin by injection molding.

Figure 7:
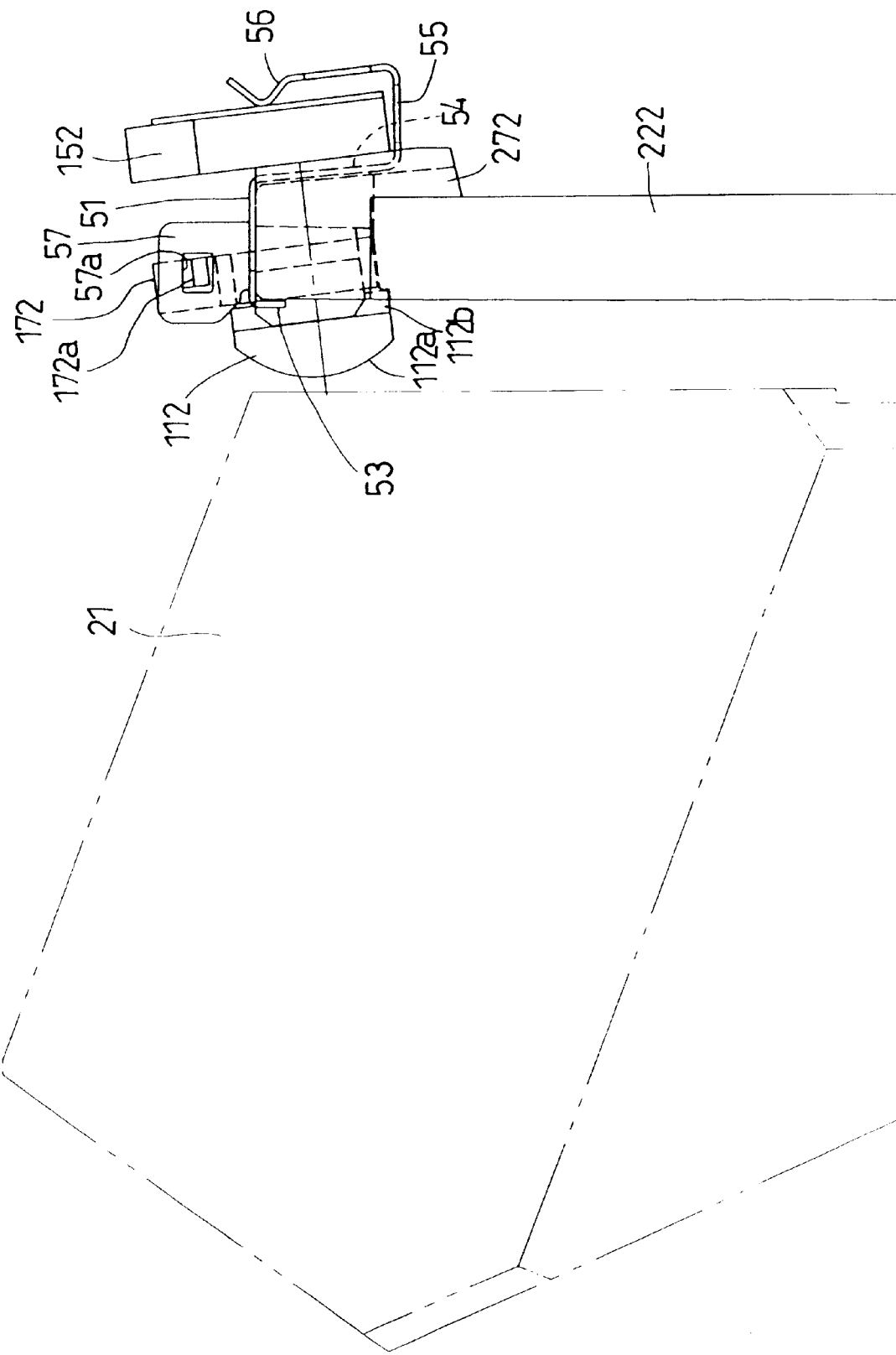
FIG. 7 is a sectional view of a photometering apparatus and a pentagonal prism holding frame and the surroundings thereof.
Figure 8:
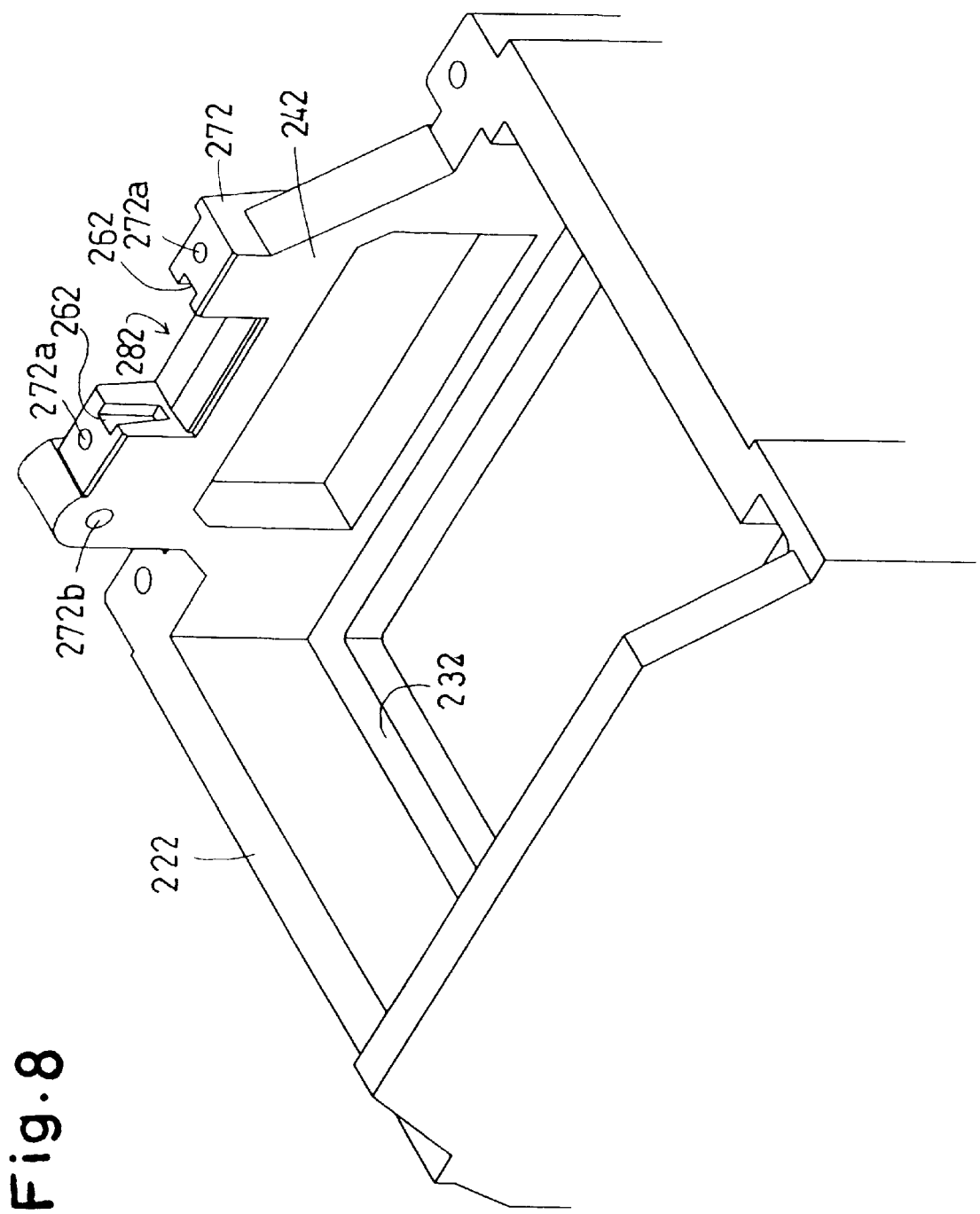
FIG. 8 is a perspective view of a pentagonal prism holding frame.

The photometering lens 112, the plane-parallel plate 172 and the light receiver substrate 152 are attached as shown in FIGS. 6 and 7. Firstly, the engaging edge projections of the photometering lens 112 are inserted in the guide grooves 262 from above. Thereafter, the light receiver retainer 51 is mounted to the mounting walls 272 so that the the shoulder portions 52 are held between the flanges 53 and 54. The screws 61 are screwed into the threaded holes 272a through the holes 52a to secure the light receiver retainer 51 to the mounting walls 272. Consequently, the open ends of the guide grooves 262 are closed by the shoulder portions 52 and the mounting flanges 112b of the photometering lens 112 are pressed. Thus, the photometering lens 112 can be firmly held due to the taper engagement (wedge effect) of the guide grooves 262 and the flanges.

Thereafter, the substrate 152 is fitted between the clip piece 56 and the flanges 54. The substrate 152 is held by the elastic force and the frictional force of the clip piece 56. When no plane-parallel plate 172 is attached, the finder screen 31 is conjugate with the light receiving surface of the light receiver 132. In this state, the centering operation (adjustment) is carried out in the same way as that of the first embodiment, discussed with reference to FIG. 5.

Upon completion of the adjustment, the screws are screwed in the threaded holes 272a through the securing holes (not shown) of the substrate 152 to secure the substrate 152 to the mounting walls 272. Thereafter, the plane-parallel plate 172 is inserted between the holding pieces 57, so that the engaging projections 172a are engaged in the engaging holes 57a. No slipping-off of the plane-parallel plate 172 occurs due to the engagement of the engaging projections 172a and the engaging holes 57a. Note that the width of the lower portion of the plane-parallel plate 172 is smaller than that of the upper portion thereof, so that the lower portion of the plane-parallel plate can be inserted between the rearwardly projecting flanges 112b of the photometering lens 112.

If guide grooves are provided on the opposite side surfaces of the flanges 112b to guide the plane-parallel plate 172, no adjustment of the position or direction of the plane-parallel plate 172 relative to the photometering lens 112 is necessary, thus resulting in an easy attachment or detachment thereof.

According to the second embodiment, the light receiver retainer 51 prevents the photometering lens 112 from being accidentally detached; holds the substrate 152; and secures the plane-parallel plate 172. Since the substrate 152 is elastically held by the clip piece 56 of the retainer 51, the adjustment of the position of the light receiver can be easily carried out. Since the plane-parallel plate 172 is held by the engagement of the engaging projections 172a and the engaging holes 57a, not only can the attachment or detachment thereof be easily carried out, but also the readjustment of the position of the light receiver can be facilitated. Namely, since the light receiver is held by the resilient retainer and since the optical element is held between a pair of resilient holding pieces of the retainer, not only can the attachment or detachment of the optical element be facilitated, but also the adjustment or readjustment of the center position of the light receiver can be easily effected.

In the illustrated embodiment, although the light receiver is made of two-split type photometering elements, it can be made of three or more photometering elements. The structure and arrangement of the photometering lens 111 and the light receiver 13 are not limited to those in the illustrated embodiment. For example, they can be located adjacent the eyepiece. In short, the photometering lens 111 and the light receiver 13 can be arranged in an optional position so long as the transparent optical element can be inserted therebetween or removed therefrom. Although the transparent optical element is made of a plane-parallel plate in the illustrated embodiment, it can be made of a lens having positive or negative power.

The shape of the light receiver retainer 51 is not limited to that of the illustrated embodiment. Namely, the light receiver retainer 51 can be of any shape so long as it can be engaged with or disengaged from the plane-parallel plate due to the elastic biasing force. For example, it is possible to provide grooves or holes on the plane-parallel plate and to provide projections on the light receiver retainer.

The above discussion has been directed to embodiments in which the plane-parallel plate is inserted after the adjustment of the photosensitivity distribution is completed. FIGS. 10 through 14 show another embodiment in which the plane-parallel plate is inserted during the adjustment of the photosensitivity distribution and is removed after the adjustment is completed. The elements corresponding to those shown in FIGS. 1 through 6 are designated with like reference numerals and no detailed explanation thereof will be given.

Figure 10:
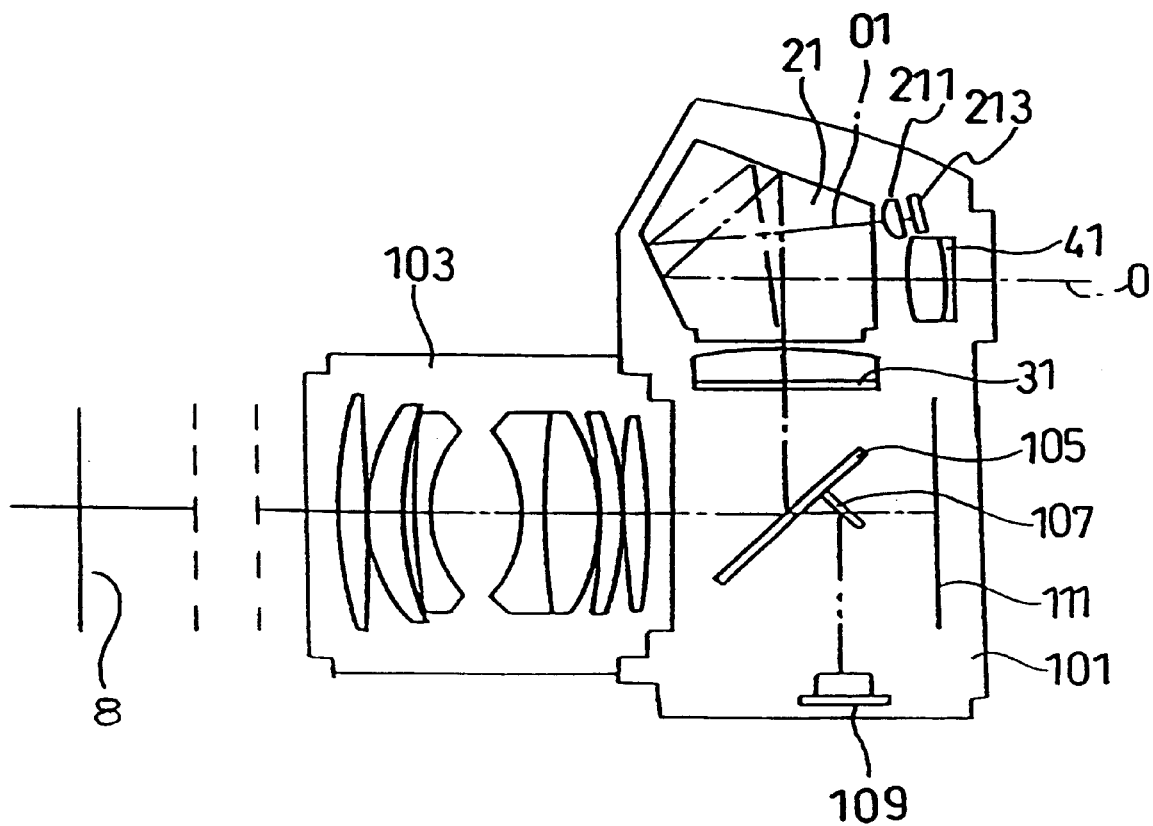
FIG. 10 is a schematic view of a single lens reflex camera to which a photometering apparatus in which a plane-parallel plate is inserted when the photosensitivity distribution is adjusted is applied according to the present invention.

FIG. 10 shows another embodiment of a single lens reflex camera to which the present invention is applied.

The object image carrying light incident upon the photographing lens 103 is partly reflected by the main mirror 105; converged onto the finder screen 31 to form (project) an object image; and is transmitted therethrough. The light transmitted through the finder screen 31 is reflected by the pentagonal prism 21; is partly transmitted through the photometering lens 211; and is received by the light receiver 13.

Figure 11:
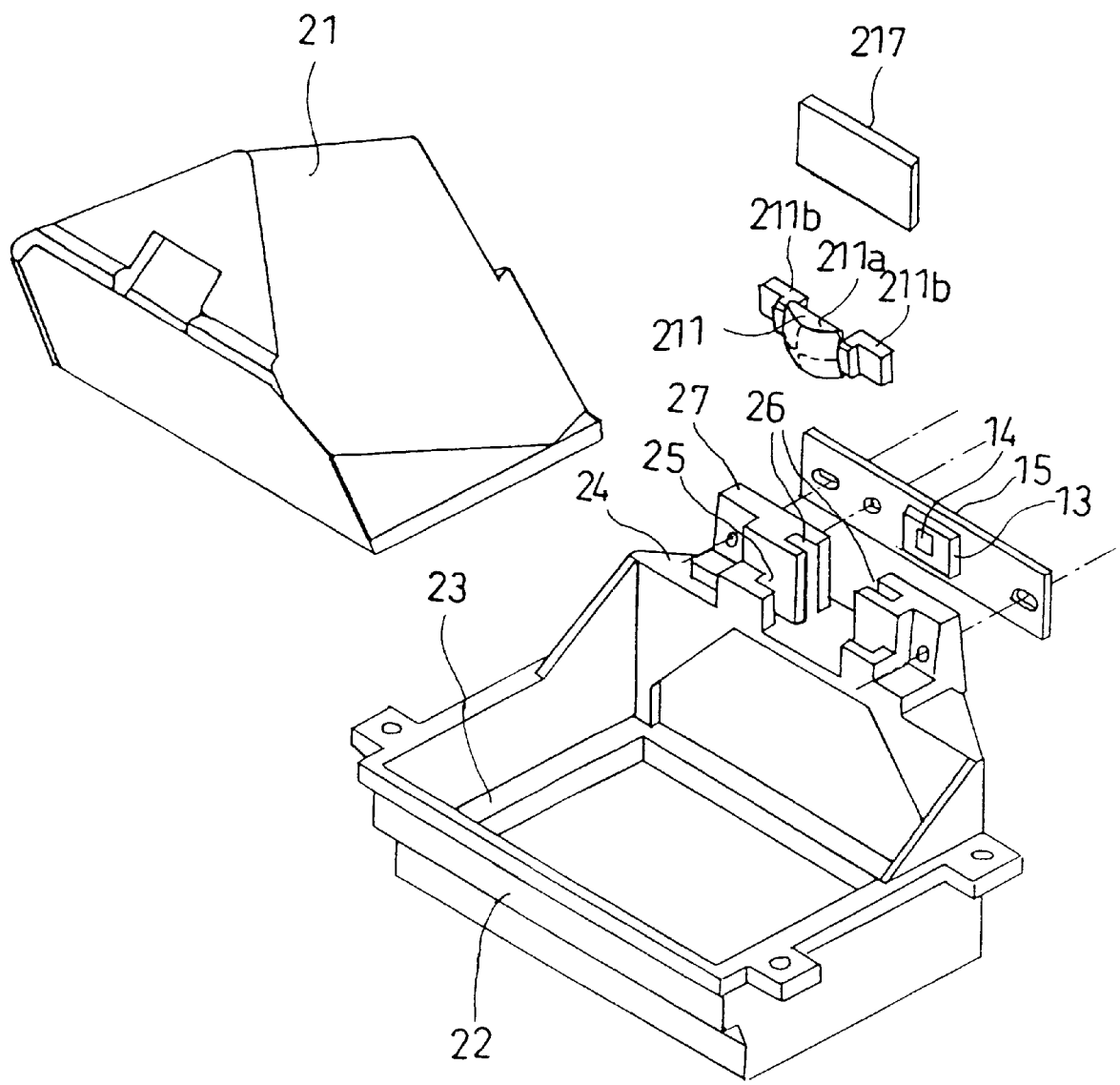
FIG. 11 is an exploded perspective view of a photometering apparatus and a pentagonal prism.

FIG. 11 shows an exploded perspective view of the photometering apparatus and the surroundings of the pentagonal prism. The photometering apparatus includes the photometering lens 211 and the light receiver (SPD) 13. Similar to the photometering lens 111, the photometering lens 211 is made of a plastic mold,. The photometering lens 211 is provided with the lens portion 211a and the mounting flanges 211b integral therewith, on opposite sides of the lens portion.

The photometering lens 211 and the light receiver 13 are mounted to the prism holding frame (prism holder) 22 which is adapted to mount the hollow pentagonal mirror 21 to the camera body. The prism holder 22 is provided with the photometer mounting bridge portion 24 which is provided with the lens guide grooves 25, in which the photometering lens 211 is attached, and the substrate mounting walls 27 which has mounted thereto the substrate 15 of the light receiver 13. A pair of guide grooves 26 are provided between the lens guide grooves 25 and the mounting walls 27 in which the plane-parallel plate 217 as a transparent optical element is detachably held, so that the plane-parallel plate 217 lies in a plane perpendicular to the optical axis O1 of the photometering lens 211.

Figure 12:
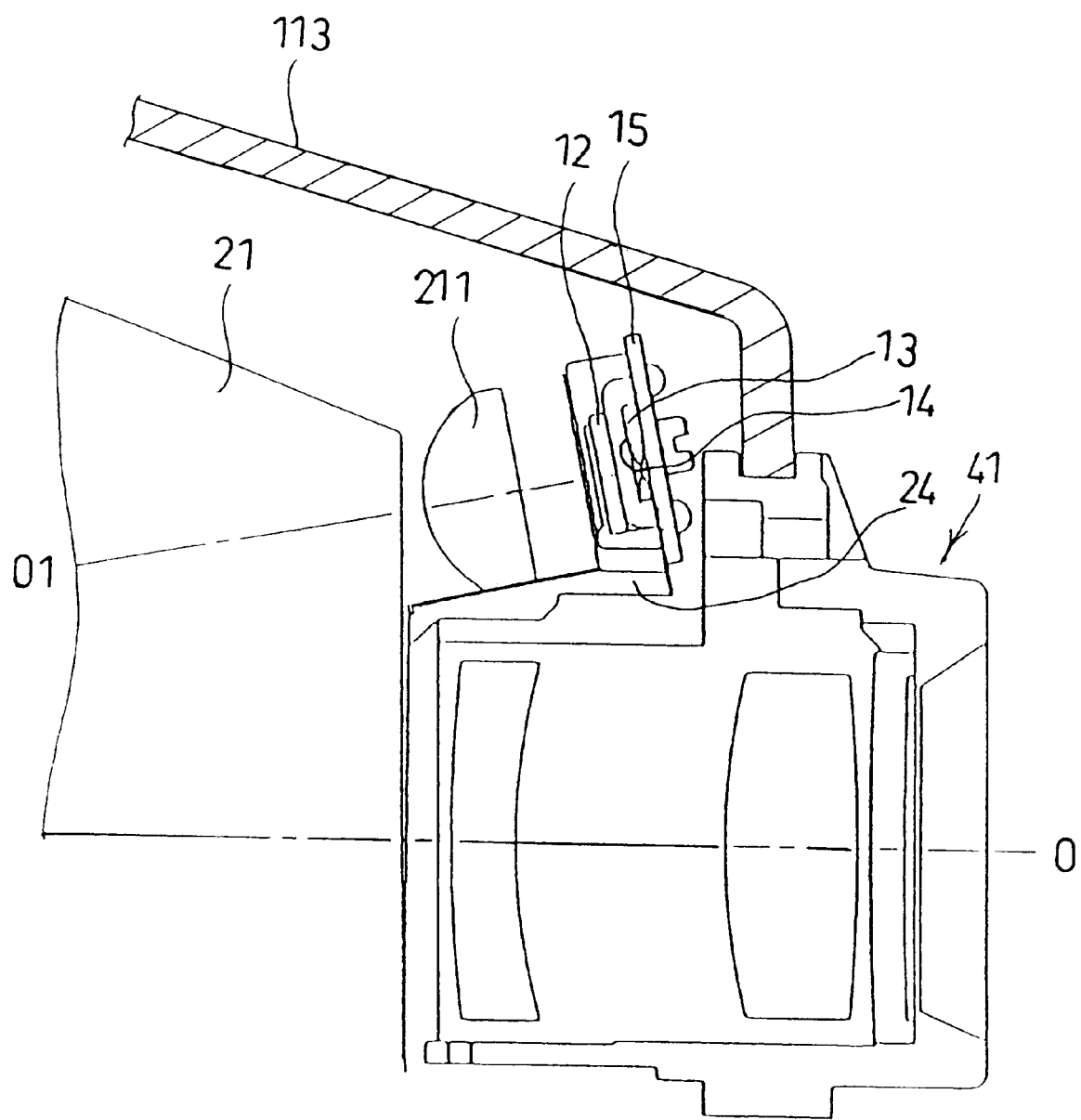
FIG. 12 is a sectional view of an assembly of a photometering apparatus.

To secure the photometering lens 211, the mounting flanges 11b are inserted in the lens guide grooves 25 and are secured thereto by means of an adhesive or the like. The substrate 15 is secured to the substrate mounting walls 27 by means of screws (not shown) so as to adjust the position thereof. The assembly is shown in FIG. 12.

The adjustment of the center (centering) of the light receiver 13 will be discussed below with reference to FIGS. 13 and 14. FIGS. 14A and 14B show a relationship between the finder screen 31 and the photometering areas. In a single lens reflex camera in the illustrated embodiment, the object image formed on the finder screen 31 is re-formed at a position in front of the light receiving surface 14 of the light receiver 13 by the photometering lens 211. Namely, an image out of focus (defocus image) is reformed. The light receiver 13 is made of split photometering elements which can independently measure the circular central photometering area 13a and the peripheral photometering area 13b surrounding the central photometering area 13a.

Figure 14A:
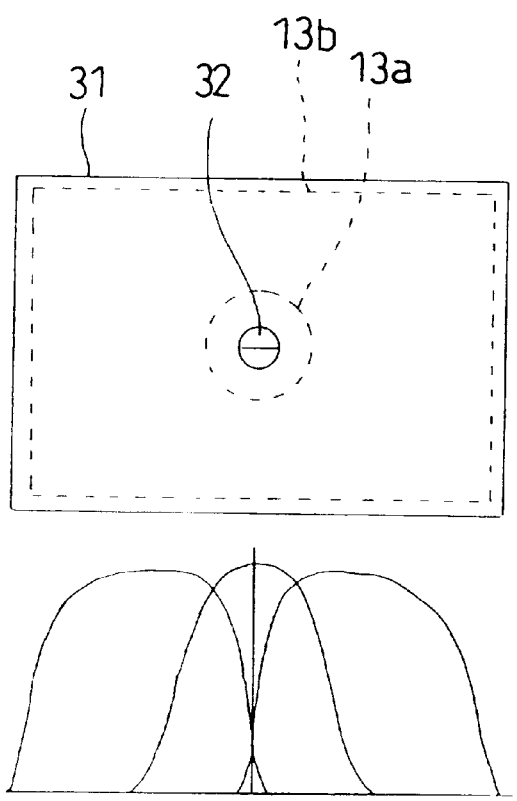
FIGS. 14A and 14B are schematic views of a relationship between a finder screen and a photometering area in a single lens reflex camera and graphs showing a photosensitivity distribution in a defocus state (out of focus state) in which a parallel-plane plate is attached and in an in-focus state in which a plane-parallel plate is removed, respectively.

FIG. 14A shows the photometering areas 13a and 13b in the defocus state in which the plane-parallel plate 217 is removed, and the photosensitivity distribution in the photometering areas 13a and 13b. FIG. 14B shows the photometering areas 13a and 13b in the in-focus state in which the plane-parallel plate 217 is mounted, and the photosensitivity distribution in the photometering areas 13a and 13b. In the graphs shown in FIGS. 14A and 14B, the ordinate represents the intensity and the abscissa represents the coordinates in the horizontal direction.

As can be seen in FIG. 14A, the image of the finder screen 31 is formed in front of the light receiving surface 14 of the light receiver 13 when the plane-parallel plate 217 is removed from the space defined between the photometering lens 211 and the light receiver 13, and hence the image formed on the light receiving surface 14 is unclear. Consequently, the photosensitivity distribution curve become relatively straight.

If the image is unclear, the change in the output of the photometering areas at the boundary thereof is small, so that it is difficult to detect the position of the boundary. Consequently, it is difficult to adjust the central photometering area 13a to be identical to the center of the finder screen 31 or to adjust the center of the light receiver 13 to be identical to the center of the finder screen 31. Moreover, if the focusing microprism 32 is provided at the center of the finder screen 31, the image in the central photometering area is diffused. Consequently, it is more difficult to detect the boundary of the photometering areas.

Figure 13:
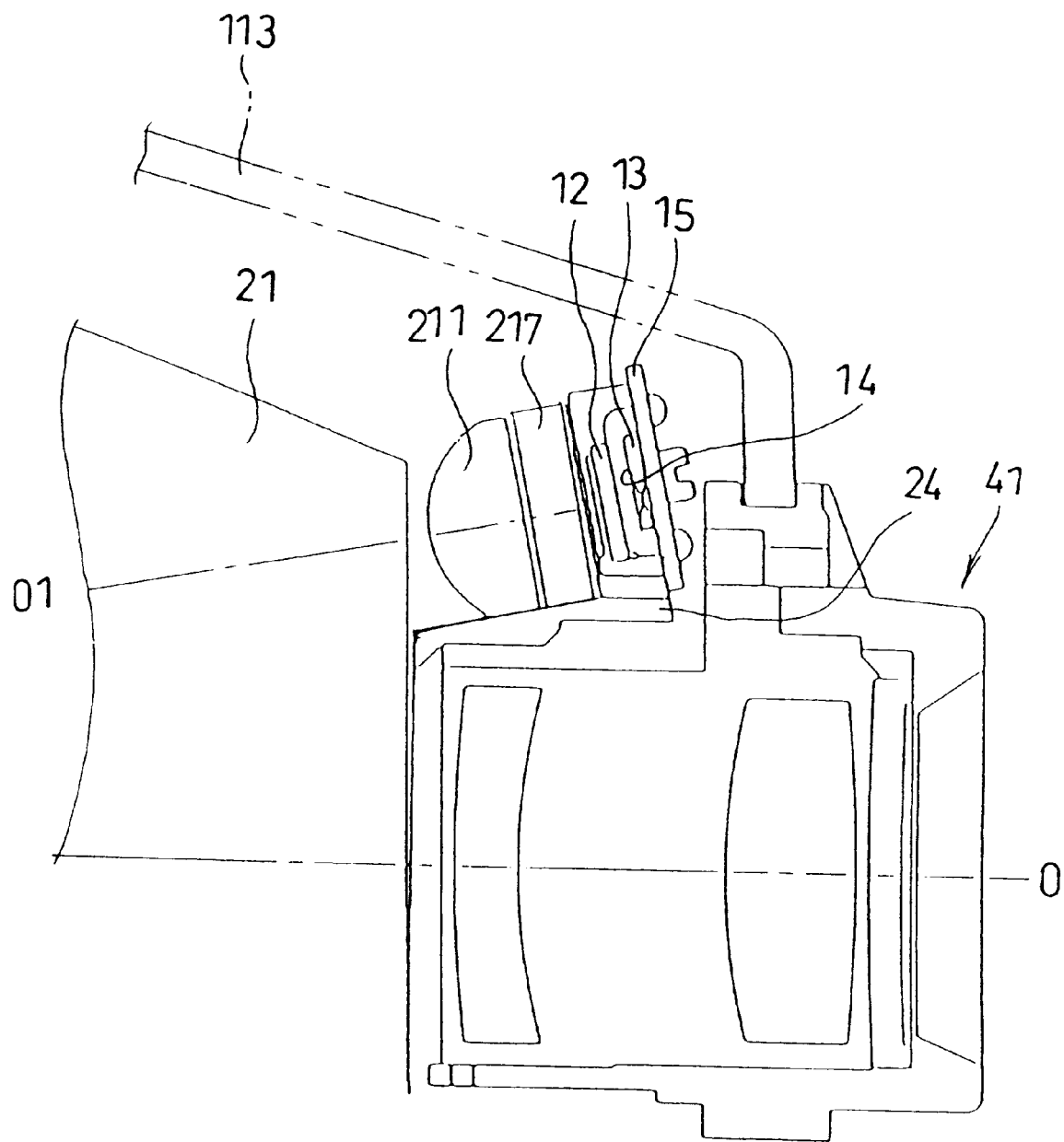
FIG. 13 is a sectional view of a photometering apparatus when a plane-parallel plate is inserted when the centering operation is carried out.
Figure 14B:
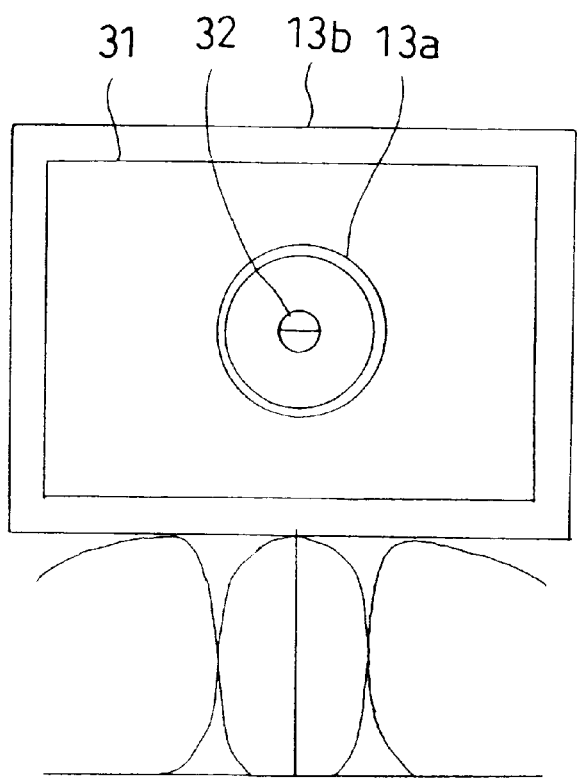

To prevent this, in the illustrated embodiment, when the centering (adjustment) of the light receiver 13 is carried out, the plane-parallel plate 217 is inserted between the photometering lens 211 and the light receiver 13 (FIG. 13). Consequently, the optical path length between the photometering lens 211 and the light receiver 13 is increased, so that the finder screen 31 is conjugate with the light receiving surface 14 of the light receiver 13. Thus, an enlarged clear image of the finder screen 31 (object image formed on the finder screen 31) can be reformed on the light receiving surface 14 of the light receiver 13 (FIG. 14B). If the image is in focus, the output boundary of the photometering areas is distinguishable, and hence the adjustment to make the center of the light receiver 13 coincident with the center of the finder screen 31 can be facilitated. Note that the light path length when the plane-parallel plate 217 is removed is decreased by t×(n−1) wherein "t" designates the thickness of the plane-parallel plate and "n" (>1) represents the refractive index thereof.

The adjustment (centering operation) will be explained below in more detail by way of example. The single lens camera to be adjusted has the upper cover 113 removed and the plane-parallel plate 217 is attached (FIG. 13). A reference chart plate 8 (FIG. 10) which lies in a plane perpendicular to the optical axis O of the photographing lens 103 is located at a predetermined object distance to perform the focusing operation. The outputs of the photometering areas 13a and 13b of the light receiver 13 are sent to a measuring device and the intensities thereof are indicated, for example, in a display.

For example, the chart plate 8 can constitute a white circular disc on a black background. Upon adjustment, the center of the chart plate 8 is located at the center of the finder screen 31. The substrate 15 is moved up and down and/or right and left along the substrate mounting walls 27 so that the image of the chartplate 8 is formed at the center of the light receiver 13. Alternatively, it is possible to move the substrate 15 up and down and/or right and left along the substrate mounting walls 27 while monitoring the output of the light receiver 13 to detect the output of the central photometering area 13a of the light receiver 13. The position at which the peak output is obtained corresponds to the center position.

Upon completion of the centering operation (adjustment) of the light receiver 13, the substrate 15 is secured by adhesive or screws, and the plane-parallel plate 217 is removed. Consequently, a photometering apparatus in which the center of the photometering area of the light receiver 13 is identical to the center of the finder screen 31 and the photosensitivity distribution smoothly changes can be obtained as shown in FIG. 14A.

In the illustrated embodiment, although the light receiver is made of two-split photometering elements, it can be made of three or more photometering elements. The structure and arrangement of the photometering lens 211 and the light receiver 13 are not limited to those in the illustrated embodiment. For example, they can be located adjacent to the eyepiece. In short, the photometering lens 211 and the light receiver 13 can be arranged in a desired position so long as the transparent optical element can be inserted therebetween. Although the transparent optical element is made of a plane-parallel plate in the illustrated embodiment, it can be made of a lens having positive or negative power. For instance, if the light receiving surface of the light receiver is located closer to the photometering lens with respect to the conjugate position with the finder screen, a convex lens can be used for the transparent optical element to establish an conjugate relationship.

What is claimed is:

1. A photometering apparatus comprising:
 a photometering lens and a light receiver to measure a finder screen of a single lens reflex camera, wherein said photometering lens and said light receiver are arranged so that said focusing screen is substantially conjugate with the light receiving surface of said light receiver, and a transparent optical element is inserted between said photometering lens and said light receiver.

2. A photometering apparatus according to claim 1, wherein said transparent optical element is made of a plane-parallel plate.

3. A photometering apparatus according to claim 1, wherein said transparent optical element is made of a lens having positive or negative power.

4. A photometering apparatus according to claim 1, wherein said transparent optical element can be removed when said adjustment of said center of said light receiver is carried out and can be attached after said adjustment is completed.

5. A photometering apparatus according to claim 2, wherein said photometering lens and said light receiver are attached to a pentagonal prism holder of a single lens reflex camera which is provided with a guide groove in which said optical element can be detachably fitted between said photometering lens and said light receiver in a plane perpendicular to said optical axis of said photometering lens.

6. A photometering apparatus according to claim 1, wherein said photometering lens is attached to a pentagonal prism holder of a single lens reflex camera which is provided with a light receiver holding retainer which elastically holds said light receiver, said light receiver holding retainer being provided with a pair of holding pieces which are adapted to elastically hold said optical element between said photometering lens and said light receiver.

7. A photometering apparatus according to claim 6, wherein said transparent optical element is made of a plane-parallel plate which is provided on opposite sides thereof with engaging projections, said light receiver holding retainer being provided on said holding pieces thereof with engaging holes in which said engaging projections can be engaged.

8. A photometering apparatus according to claim 7, wherein said pentagonal prism holding retainer is provided with a bridge portion which bridges a light path of an eyepiece, said bridge portion being provided with a pair of mounting walls on opposite sides of said light path of said photometering lens and said light receiver, said mounting walls being equipped on opposite end surfaces thereof with guide grooves in which said photometering lens can be fitted, said light receiver holding retainer being provided with a pair of shoulder portions which can hold therebetween said mounting walls from above and holding pieces which are provided on said shoulder portions to hold said transparent optical element between said holding pieces.

9. A photometering apparatus according to claim 8, wherein said light receiver holding retainer is provided with a clip piece which is adapted to elastically hold a substrate to which said light receiver is attached.

10. A photometering apparatus according to claim 1, wherein said light receiver is made of split photometering elements.

11. A photometering apparatus according to claim 1, wherein said light receiver is made up of split photometering elements which can independently measure a circular central photometering area and a peripheral photometering area surrounding said central photometering area.

12. A photometering apparatus according to claim 1, herein said finder screen is provided on said center ortion thereof with a focusing split prism or microprism.

13. A photometering apparatus comprising:

a photometering lens and a light receiver to measure a finder screen of a single lens reflex camera, wherein said photometering lens and said light receiver are arranged so that a transparent optical element can be inserted therebetween and that said focusing screen is substantially conjugate with a light receiving surface of said light receiver when said transparent optical element is inserted.

14. A photometering apparatus according to claim 13, wherein said transparent optical element is made of a plane-parallel plate.

15. A photometering apparatus according to claim 13, wherein said transparent optical element is made of a lens having positive or negative power.

16. A photometering apparatus according to claim 13, wherein said transparent optical element is inserted when a centering operation of said light receiver is carried out, and can be removed when said centering operation is completed.

17. A photometering apparatus according to claim 13, wherein said photometering lens and said light receiver are attached to a pentagonal prism holder of a single lens reflex camera which is provided with a guide groove in which said optical element can be detachably fitted between said photometering lens and said light receiver in a plane perpendicular to said optical axis of said photometering lens.

18. A photometering apparatus according to claim 13, wherein said light receiver is made of split photometering elements.

19. A photometering apparatus according to claim 13, wherein said light receiver is made up of split photometering elements which can independently measure a circular central photometering area and a peripheral photometering area surrounding said central photometering area.

20. A photometering apparatus according to claim 13, wherein said finder screen is provided on said center portion thereof with a focusing split prism or microprism.

21. A method for adjusting a photometering apparatus comprising a photometering lens and a light receiver to measure a finder screen of a single lens reflex camera, wherein a transparent optical member can be inserted in between said photometering lens and said light receiver and wherein said finder screen is substantially conjugate with the surface of said light receiver when said optical member is inserted in between said photometering lens and said light receiver;

said method comprises:

the insertion of said transparent optical member in between said photometering lens and said light receiver;

the formation of an image chart on said light receiver via: a photographing lens of said single reflex camera, said finder screen, and said photometering lens and said optical member;

adjustment of the mutual position of said photometering lens and said light receiver according to said image chart formed on said light receiver;

the removal of said optical member from between said photometering lens and said light receiver after said adjusting is completed.

22. A method for adjusting a photometering apparatus comprising a photometering lens and a light receiver to measure a finder screen of a single lens reflex camera, wherein a transparent optical member can be inserted in between said photometering lens and said light receiver and wherein said finder screen is substantially conjugate with the surface of said light receiver when said optical member is not inserted in between said photometering lens and said light receiver;

said method comprises:

the formation of an image chart on said light receiver via: a photographing lens of said single reflex camera, said finder screen, and said photometering lens and said optical member;

adjustment of the mutual position of said photometering lens and said light receiver according to said image chart formed on said light receiver;

the insertion of said optical member from between said photometering lens and said light receiver after said adjusting is completed.

* * * * *